United States Patent [19]

Andress, III

[11] Patent Number: 5,592,883

[45] Date of Patent: Jan. 14, 1997

[54] MONORAIL TRANSPORTATION SYSTEM AND VEHICLE FOR TRAVELING THEREON

[76] Inventor: F. Jay Andress, III, 3524 Holly Ave., Cincinnati, Ohio 45208

[21] Appl. No.: 243,257

[22] Filed: May 16, 1994

[51] Int. Cl.⁶ .................................................. B61B 3/00
[52] U.S. Cl. ...................... 104/88.03; 104/93; 104/95; 105/51; 105/153; 105/154
[58] Field of Search .................... 104/88.3, 89, 91, 104/94, 93, 95, 118, 121; 105/51, 153, 154, 155; 244/93

[56] References Cited

U.S. PATENT DOCUMENTS

| | | | |
|---|---|---|---|
| 606,284 | 6/1898 | Grosvenor | 104/95 |
| 1,853,233 | 4/1932 | Schwarz | 244/93 |
| 3,101,677 | 8/1963 | Ehinger . | |
| 3,129,671 | 4/1964 | Vanderbeck | 104/93 X |
| 3,254,608 | 6/1966 | Alden . | |
| 3,345,951 | 10/1967 | Rethorst | 104/91 |
| 3,380,398 | 4/1968 | Wainwright et al. | 104/95 X |
| 3,568,605 | 3/1971 | Pettit | 104/95 |
| 3,590,743 | 7/1971 | Larson . | |
| 3,631,806 | 1/1972 | Barthalon . | |
| 3,817,182 | 6/1974 | Bourassa | 104/88 C X |
| 3,847,085 | 11/1974 | Rypinski . | |
| 3,861,315 | 1/1975 | Rypinski . | |
| 4,425,851 | 1/1984 | Long | 104/95 X |
| 4,791,871 | 12/1988 | Mowll | 104/88 D X |
| 4,841,871 | 6/1989 | Leibowitz | 104/94 X |
| 5,138,952 | 8/1992 | Low . | |
| 5,220,870 | 6/1993 | Larson | 105/215.2 X |
| 5,289,778 | 3/1994 | Romine | 105/72.2 X |

FOREIGN PATENT DOCUMENTS

| | | |
|---|---|---|
| 1353039 | 5/1964 | France . |
| 432859 | 11/1924 | Germany . |
| 1248808 | 10/1971 | United Kingdom . |
| WO9101908 | 2/1991 | WIPO . |

OTHER PUBLICATIONS

Patent Cooperation Treaty International Search Report of application No. PCT/US95/05934 dated Sep. 14, 1995.

*Primary Examiner*—S. Joseph Morano
*Attorney, Agent, or Firm*—Wood, Herron & Evans, P.L.L.

[57] ABSTRACT

A monorail transportation system has an elongated, overhead monorail (12) with a vehicle (14) having a coupler (16) that movably travels along the upper surface of monorail (12) and a drive wheel (20) that engages the lower surface or underside of monorail (12) to propel vehicle (14) therealong. The coupler (16) and drive wheel (20) are recessed in the top of the vehicle (14) during road travel and extended for travel along the monorail (12). The vehicle includes a movable sled (130) that carries the vehicles batteries (56) to balance the vehicle (14) about its longitudinal centerline during travel along the monorail (12).

66 Claims, 4 Drawing Sheets

MONORAIL TRANSPORTATION SYSTEM AND VEHICLE FOR TRAVELING THEREON

BACKGROUND

1. Field of the Invention

The present invention relates to monorail transportation systems in general and, more specifically, to monorail transportation systems wherein a vehicle may be attached to the monorail for travel therealong or separated from the monorail for independent travel.

2. Description of Prior Art

Monorail transportation systems, and other overhead rail transportation systems, have been proposed as a means for reducing traffic congestion. In a monorail system, a vehicle is typically suspended beneath an overhead rail such that the vehicle is elevated above the ground. By elevating the rail above the ground, the land surface under the rail may be used for standard roadways to increase the volume of traffic that a given area may service, or to permit the land to be used for other purposes. Alternatively, a multiple rail overhead system has been used wherein a vehicle is suspended from, travels along, or travels between multiple rails.

Monorail transportation systems lend themselves well to mass transit wherein a discrete number of vehicles each capable of holding a large number of people are used, much like subway systems. However, due to the reluctance of the public to use mass transit and the necessity of stations for the loading and unloading of passengers, it has been found beneficial to adapt small occupancy vehicles for travel along the monorail.

One proposal to adapt a small occupancy vehicle for travel along a monorail uses a specially designed vehicle that is capable solely of traveling along the monorail system. Although this permits small numbers of individuals to freely travel along a monorail system, such a system is inconvenient because users must still travel from their homes to a separate location for boarding a vehicle on the monorail system.

Other proposals for adapting vehicles for travel along monorail systems permit the vehicles to travel on ordinary road surfaces when separated from the monorail system. However, these attempts suffer from other drawbacks. Specifically, one attempt modifies a bus-like vehicle for suspension underneath a monorail. In this device, the bus may travel independently from the monorail along ordinary road surfaces. To travel along the monorail, the bus is attached to a motor unit that is a permanent component of the monorail. Although such a system permits a vehicle to travel independently of the monorail, it requires that the system include a large number of motor units permanently attached to the monorail. Thus, to provide continuous service along the monorail, motor units must be spaced along the entire system. This increases the cost and complexity of the overall system and also increases the cost of operation as all the drive units must be continuously driven along the monorail.

A similar proposal adapts ordinary automobiles for travel along a monorail by securing a suspending tube on the top of the automobile. The suspending tube suspends the automobile from a motorized trolley car that is permanently attached to the monorail. While this system permits the automobile to be driven independently from the monorail system, it too requires a continuous supply of trolley cars along the monorail system. Further, the suspending tube presents an unsightly appearance when the automobile is traveling independently from the monorail.

One proposal to eliminate the need for drive units permanently attached to the monorail system is to adapt a vehicle to travel between two vertically displaced rails. In this system, a vehicle includes a plurality of guide wheels on the roof of the vehicle that are spaced to grip the sides of the upper rail for providing lateral support to the vehicle while traveling along the system. The bottom of the vehicle includes side wheels for providing lateral support while traveling on ordinary road surfaces and a central drive wheel that propels the vehicle along the lower rail. Although such a system eliminates the need for drive units permanently attached to the monorail system, the guide wheels on the roof of the vehicle present an unsightly appearance. Additionally, a new vehicle substantially different from existing automobiles would be required for operation on the system. Still further, by suspending the vehicle between upper and lower rails, it would be difficult to remove a vehicle from the system should it become disabled.

An additional problem associated with all currently proposed systems is that the guide wheels are too small to withstand the high rotational speed needed for the vehicle to travel at high speeds. In particular, with small guide wheels, the bearings would tend to break down in operation and require frequent maintenance.

SUMMARY OF THE INVENTION

In accordance with the present invention, a monorail transportation system is provided which overcomes various drawbacks associated with previously proposed monorail systems. More specifically, the monorail transportation system of the present invention comprises an elongated, overhead monorail and a vehicle having a coupler for movably supporting the vehicle from the upper surface of the monorail and a drive wheel for engaging the lower surface of the monorail for propelling the vehicle along the monorail when the vehicle is attached thereto.

An electric supply may be made accessible along the monorail with the vehicle having an electric connector for drawing power from the electric supply. In turn, this power is transmitted to an electric motor on the vehicle that is operatively interconnected to the drive wheel.

The vehicle may be adapted to travel on standard road surfaces when separated from the monorail. If so adapted, the power source for propelling the vehicle during road travel may be independent from the electric motor that propels the vehicle on the monorail. This power source may be another electric motor, in which case batteries should be included on the vehicle for providing power when traveling separate from the monorail. To increase the range of the vehicle, these batteries may be charged while the vehicle is traveling on the monorail. Also, the coupler and drive wheel may be movable between a recessed position wherein the coupler and drive wheel are withdrawn into the top of the vehicle to be hidden from view during road travel and an extended position wherein the coupler and drive wheel are extended above the vehicle for engagement with the monorail.

The monorail may include a pair of laterally adjacent, U-shaped channels formed therein. To this end, the monorail may be a modified I-beam with a pair of elongated, substantially vertical outer rails extending upwardly from the left and right sides of the lower, substantially horizontal flange.

The coupler may consist of a pair of brackets pivotally connected to the top of the vehicle that may be pivoted forwardly and rearwardly between a recessed position and an extended position. Rotatably connected to each of the brackets is a pair of guide wheels that are spaced to be movably received within the U-shaped channels of the monorail. Further, the guide wheels may have a cylindrical main body with radially outwardly extending cylindrical flanges along the inside edges. The guide wheels are laterally spaced apart so that the cylindrical bodies are movably supported on the top surfaces of the U-shaped channels with the cylindrical flanges being received within the channels themselves.

It is contemplated that only one drive wheel is needed which is rotatably mounted to a platform that is in turn pivotally mounted to the top of the vehicle. To move the drive wheel between its recessed position and extended position, a rigid lift member, such as a mechanically actuated cylinder, or a resilient lift member, such as an inflatable air bladder, is positioned beneath the platform. As the bladder is inflated or the mechanical cylinder is extended, the platform is pivoted and the drive wheel is extended to engage the lower surface or underside of the monorail. Together the coupler and drive wheel engage the upper and lower surfaces of the monorail respectively therebetween.

The vehicle may also include an unpowered traveler wheel pivotally mounted to the top of the vehicle in the same manner as the drive wheel. The traveler wheel also engages the lower surface of the monorail.

To assist in balancing the vehicle about its longitudinal axis when traveling on the monorail, the vehicle may include a movable sled mounted thereon. A mass, such as the batteries for an all electric vehicle, is placed on the sled whereby movement of the sled alters the center of gravity of the vehicle. To move the sled, a sled motor is mounted on the vehicle and is threadably connected to the sled by a drive screw. Activation of the motor moves the sled relative the vehicle altering the vehicle's center of gravity.

To further enhance use of the system, the transportation system may include a computer system. This system may include an onboard computer as well as remote computers that may control navigation and speed of the vehicle during travel along the monorail. Further, the system may be linked with the Global Positioning System.

By virtue of the foregoing, there is thus provided a monorail transportation system that is adapted to support a vehicle therefrom, wherein the vehicle includes a drive unit for propelling the vehicle along the monorail. Additionally, the structure for supporting and propelling the vehicle along the monorail may be recessed within the vehicle during normal road travel so as to eliminate any unsightly appearance. Further, the vehicle may travel under its own power when separated from the monorail but draw power from the monorail during travel therealong.

These and other objects and advantages of the present invention shall become apparent from the accompanying drawings and the detailed description thereof.

BRIEF DESCRIPTION OF THE DRAWINGS

The accompanying drawings, which are incorporated in and constitute a part of this specification, illustrate embodiments of the invention and, together with a general description of the invention given above, and the detailed description given below, serve to explain the principles of the invention.

DETAILED DESCRIPTION OF THE DRAWINGS

Figure 1:
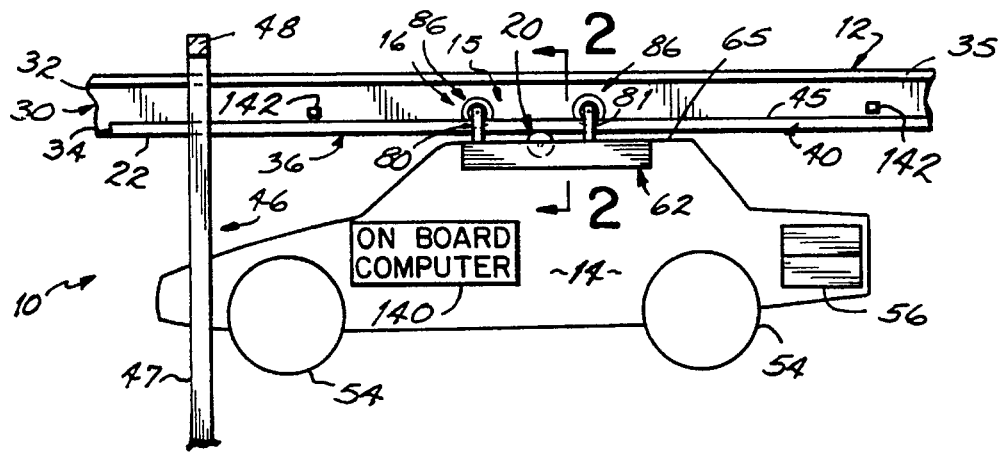
FIG. 1 is a side elevational view of a monorail transportation system in accordance with the principles of the present invention.

With references to FIGS. 1–5, there is shown a monorail transportation system 10 comprising an elongated, overhead monorail 12 and a vehicle 14 having a drive system 15 including an unpowered coupler 16 adapted to movably support vehicle 14 from the upper surface 18 of monorail 12 and a drive wheel 20 for engaging the lower surface or underside 22 of monorail 12 that is powered by an electric motor 24 for propelling vehicle 14 along monorail 12 as will be described below.

Figure 2:
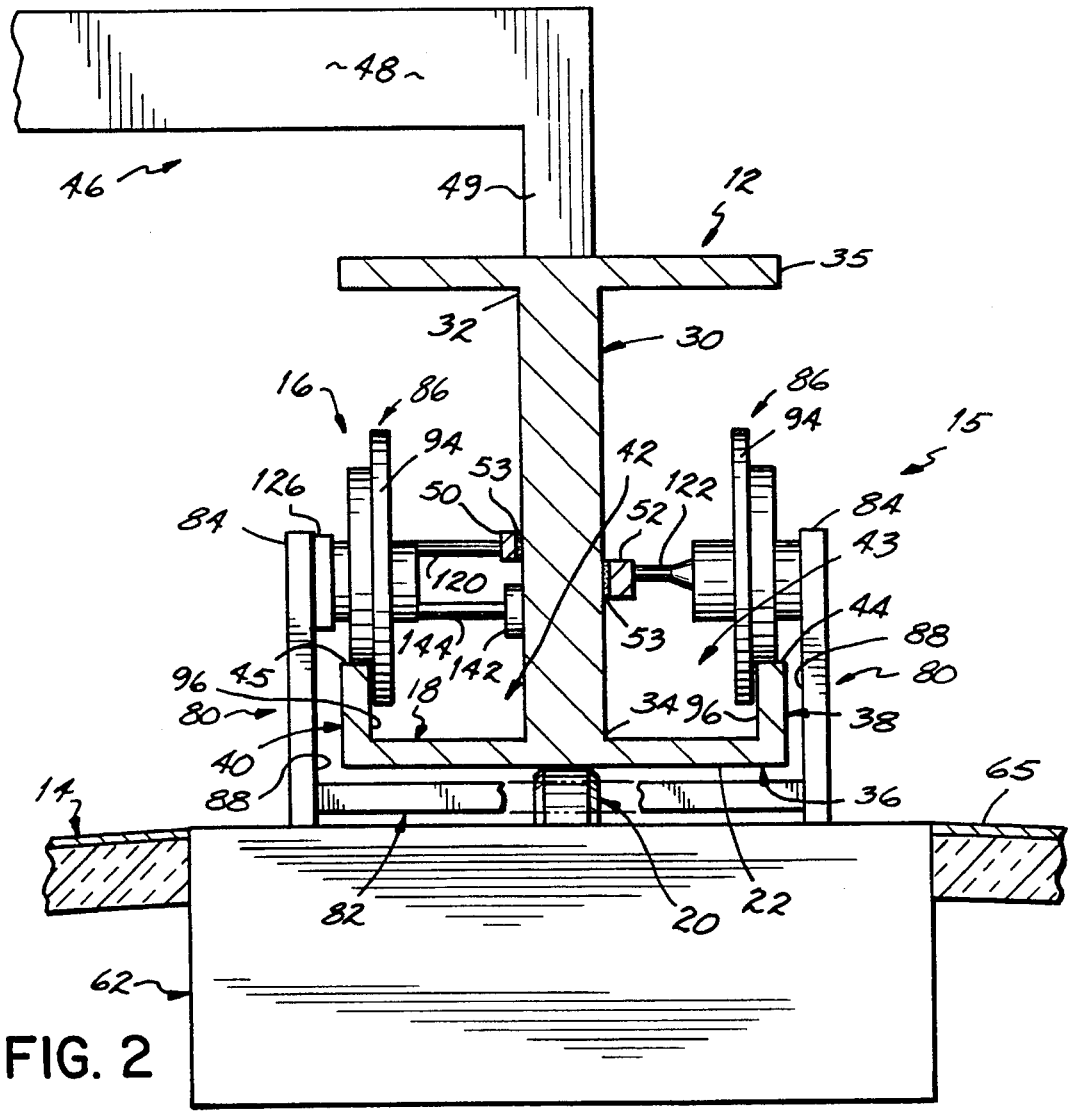
FIG. 2 is an enlarged sectional view taken along line 2—2 of FIG. 1.

As best seen in FIG. 2, overhead monorail 12 is preferably a modified I-beam having a standard, substantially vertical central web 30 with an upper end 32 and a lower end 34 and standard upper and lower, substantially horizontal flanges 35, 36 medially attached to upper and lower ends 32, 34 of central web 30 respectively. The underside of horizontal flange 36 defines lower surface 22 of monorail 12. Additionally, elongated, substantially vertical outer rails 38, 40 are secured to the right and left sides of horizontal flange 36 and extend upwardly therefrom. Together, central web 30, horizontal flange 36, and outer rails 38, 40 form a pair of laterally adjacent, U-shaped channels 42, 43, at least one of the inside surfaces of which may be seen to define upper surface 18 of monorail 12. However, upper surface 18 may also include the upper surfaces 44, 45 of outer rails 38, 40. In this configuration, monorail 12 has a cross-sectional width and height of about 10 inches. Further, lower horizontal flange 36 may be modified to have a substantially horizontal, concave face that defines lower surface 22 to assist in retaining drive wheel 20 thereon.

To support monorail 12 above the ground, transportation system 10 includes a plurality of T-shaped supports 46, comprising a vertical riser 47 and a horizontal cross bar 48 medially supported thereon. A monorail 12 may be supported from each of the ends of cross bar 48 by a vertical tie 49 secured to horizontal flange 35 (see FIG. 2). By supporting two monorails 12 from each support 46, the affected land surface is minimized.

Although monorail 12 is described as being made from a modified I-beam, as will be readily appreciated by those skilled in the art, other structures may be used to manufacture the monorail. However, it is believed that the described modified I-beam structure provides a high strength and inexpensive monorail.

Monorail 12 may have an electric supply accessible therealong for powering vehicles traveling along the monorail. To this end, the electric supply is made accessible through elongated, electric conductors 50, 52 mounted by any accepted means on opposing sides of central web 30. Electric conductors 50, 52 are insulated from monorail 12 to prevent shorting of the system by an insulating material 53 as is well known in the art. Placement of electric contacts 50, 52 on opposing sides of central web 30 reduces the risk of injury to people as both contacts must be engaged before an electric current will flow. However, a single electric conductor may be secured to monorail wherein monorail 12 itself serves as the second conductor, such as a ground. Further it is contemplated that the electric supply may be alternating current or direct current.

Referring to FIG. 1, vehicle 14 preferably is adapted to travel on ordinary road surfaces when separated from monorail 12. To this end, vehicle 14 is contemplated to have a standard automobile configuration including four road surface wheels 54 and a propulsion system (not shown) operatively interconnected to at least two of the road surface wheels 54. Further, this propulsion system is preferably independent from electric motor 24 and may be a gasoline or diesel engine and transmission or transaxle as is conventional. However, it is beneficial to use an electric motor for the propulsion system to render vehicle 14 a true zero emission vehicle because of the recent push for such vehicles.

For example, the State of California is mandating that 2% of all new vehicles sold after 1998 be zero emission vehicles, with this percentage increasing each year to a total of 10% of all vehicles by the year 2003. The only practical vehicles currently available to achieve zero emissions are electric vehicles. However, the driving range of electric vehicles is currently limited to under 150 miles (and more realistically to under 100) by the storage capacity of the batteries used in powering the vehicle. Additionally, these batteries, possibly the single most expensive item on an electric vehicle, are estimated to require replacement approximately every 20,000 miles. With an electric drive unit, vehicle 14 includes a plurality of batteries 56 for powering vehicle 14 when separated from monorail 12. These batteries 56 are shown stored in the rear of vehicle 14, although any location throughout vehicle 14 may be used. By using an all electric vehicle 14 in conjunction with monorail transportation system 10, travel along monorail 12 extends the range of vehicle 14. Further, as will be discussed below, batteries 56 may be charged during travel along monorail 12. Still further, the life of batteries 56 are extended by reducing the time that vehicle 14 travels independently from monorail 12, during which time batteries 56 are used, to propelling vehicle 14 to and from monorail transportation system 10.

Although it is contemplated that vehicle 14 will be adapted to travel on standard road surfaces under its own power independent of monorail 12, as will be readily appreciated by those skilled in the art, vehicle 14 may be manufactured without these features. In this aspect of the invention, vehicle 14 may travel along monorail 12 supported by coupler 16 and propelled by drive wheel 20. However, a separate vehicle would be required to transport vehicle 14 to and from monorail transportation system 10. Nevertheless, such a system may be desirable for transporting cargo loads over long distances.

Vehicle 14 is supported from monorail 12 by coupler 16. Coupler 16 is preferably movable between a recessed position (shown in phantom lines in FIG. 3A) within the top of vehicle 14 during road travel and an extended position (shown in solid lines) to movably support vehicle 14 from monorail 12 during travel therealong. Similarly, drive wheel 20 is also preferably movable between a recessed position (shown in phantom lines in FIGS. 3A and 3B) within the top of vehicle 14 during road travel and an extended position (shown in solid lines) for engaging lower surface or underside 22 of monorail 12 during travel therealong, To this end, the top of vehicle 14 includes a rectangular cavity 62 having a length of about 48 inches and a width of about 18 inches and extends rearwardly from just behind the windshield of vehicle 14. The cavity floor 64 is about 9 inches below the top 65 of vehicle 14. Coupler 16 and drive wheel 20 are located within cavity 62 such that they are substantially hidden from view when in the recessed position. Further, cavity 62 may include a removable or openable cover (not shown) to hide and protect coupler 16 and drive wheel 20 when vehicle 14 is separated from monorail 12.

Drive wheel 20 is approximately 8 inches in diameter and is rotatably mounted near the back edge of a platform 66 by a pair of upwardly extending flanges 68. Drive wheel 20 may be an inflatable wheel but other wheels may be used. However, drive wheel 20 should have a rubber-like surface to provide traction with lower surface or underside 22 of monorail 12. Platform 66 is about 20 inches in length and about 18 inches in width. The front edge 70 of platform 66 is pivotally mounted to cavity floor 64. A lift member is positioned between cavity floor 64 and platform 66 near the back edge thereof.

Figure 3A:
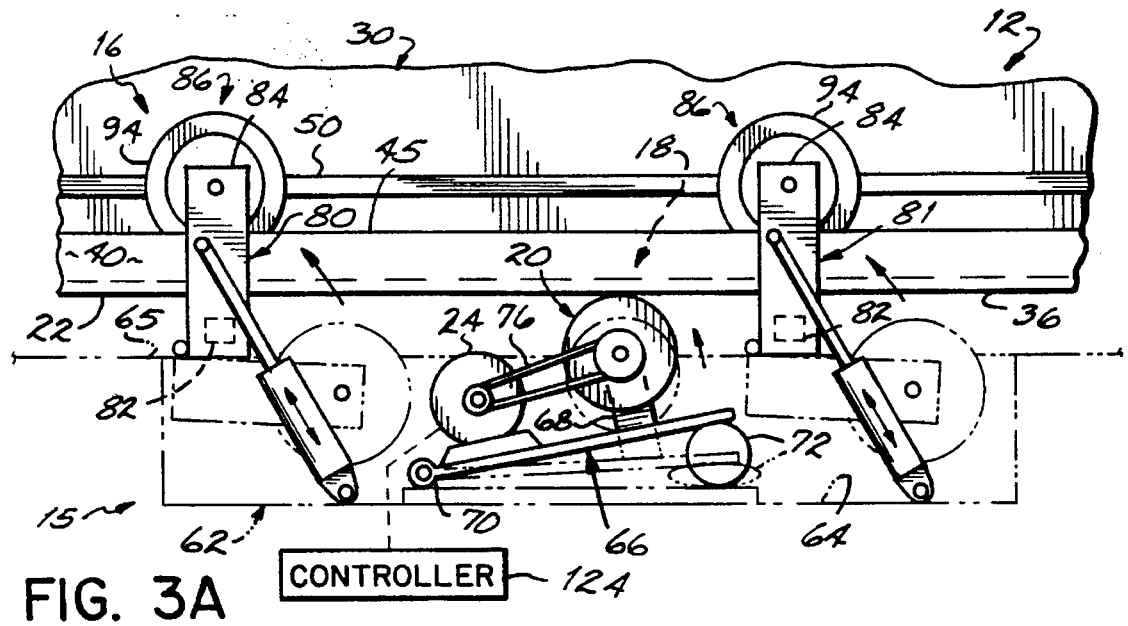
FIG. 3A is a side elevational view of the monorail and drive system for the monorail transportation system of FIG. 1 with an inflatable air bladder lift member.

As shown in FIG. 3A, the lift member may be resilient or flexible, such as an inflatable air bladder 72. To move drive wheel 20 to its extended position, air bladder 72 is inflated by an onboard air compressor (not shown) thereby pivoting platform 66 about front edge 70 and raising drive wheel 20 to engage the lower surface or underside 22 of monorail 12. To lower drive wheel 20, air bladder 72 is deflated. Air bladder 72, or other resilient lift member, permits drive wheel 20 to easily accommodate variations in the surface of monorail 12 without necessitating a further shock absorbing system.

Figure 3B:
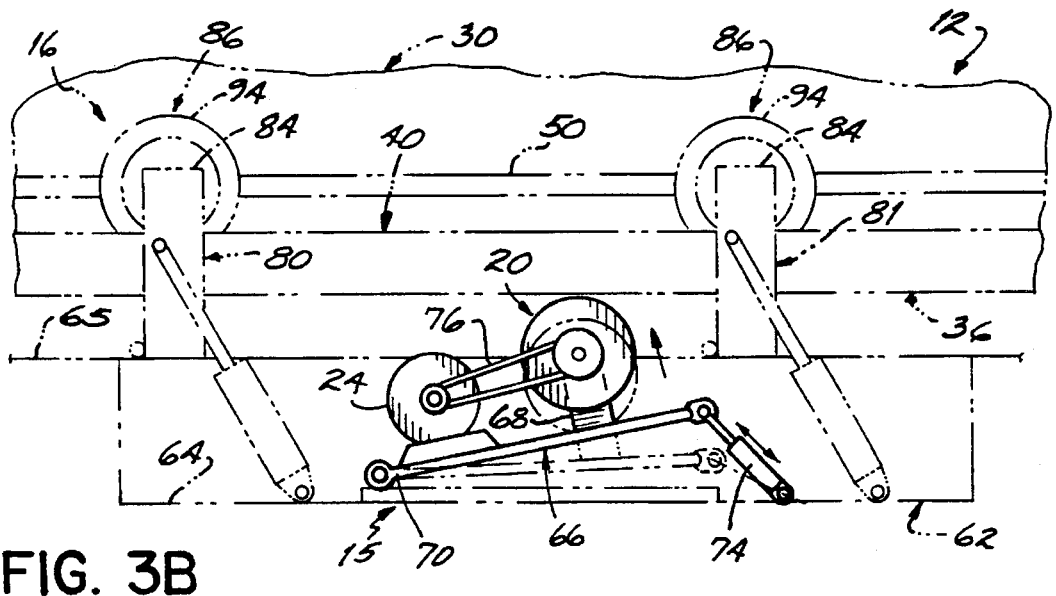
FIG. 3B is a view similar to FIG. 3A but with a mechanical cylinder lift member.

Alternatively, as shown in FIG. 3B, the lift member may be rigid, such as a mechanically actuated cylinder 74 positioned between cavity floor 64 and platform 66. As with air bladder 72, actuation of cylinder 74 pivots platform 66 and raises drive wheel 20. Mechanically actuated cylinder 74 (i.e., motor or hydraulic) permits the extension of drive wheel 20 to be more accurately controlled than with air bladder 72. Still further, drive wheel 20 may be rotatably mounted directly to the lifting member, eliminating platform 66.

To power drive wheel 20, electric motor 24 is mounted near the front of platform 66. Electric motor 24 is operatively interconnected to drive wheel 20 by a belt and pulley structure 76. However, electric motor 24 may be located in other convenient locations, on or off platform 66, as will be readily appreciated by those skilled in the art. Further, drive wheel 20 may be directly connected to the output shaft of electric motor 24. This would eliminate potential slippage in the belt and pulley system 76.

With an 8 inch drive wheel 20, it is estimated that a vehicle having a weight of approximately 1,500 pounds could be powered by a 10 horsepower, 8,000 rpm direct or alternating current electric motor and achieve speeds of approximately 180 miles per hour. Further, it is contemplated that electric motor 24 will draw its power from an electric supply in monorail 12 such as by conductors 50, 52 as will be discussed below. Based upon current electric costs, it is estimated that electric motor 24 could be operated for an hour at a cost of approximately $0.40.

By having drive wheel 20 bear against the lower surface or underside 22 of monorail 12 for propelling vehicle therealong, several advantages are obtained. First, drive wheel 20, in conjunction with coupler 16, grips both sides of monorail 12 more securely retaining vehicle 14 thereto, Further, lower surface or underside 22 is less exposed to the environment than an upper surface thereby reducing environmental effects (i.e., ice and snow) on performance of vehicle 14.

Coupler 16, which movably supports vehicle 14 from monorail 12, comprises front bracket 80 and rear bracket 81 pivotally mounted to vehicle 14 within cavity 62. Coupler 16 is pivotable in the longitudinal direction between a recessed position during road travel and an extended position for supporting vehicle 14 from monorail 12. Front bracket 80 is shown mounted forward of drive wheel 20 and rear bracket 81 is shown mounted rearward of drive wheel 20. However, the position of brackets 80, 81 may vary. Brackets 80, 81 each include a lateral base member 82 with two upwardly extending arms 84 (when brackets 80, 81 are in the extended position). A pair of unpowered guide wheels 86 are rotatably mounted along the inside surfaces 88 of arms 84 of each of brackets 80, 81. Guide wheels 86 are laterally spaced to be movably received within U-shaped channels 42, 43 of monorail 12. Further, to provide additional stability to vehicle 14 during travel along monorail 12, guide wheels 86 have a cylindrical body 90 adapted for travel along the upper surfaces 44, 45 of outer rails 38, 40 and a radially outwardly extending cylindrical flange 94 along the inside edge of cylindrical body 90. Guide wheels 86 are spaced such that cylindrical flange 94 abuts the inside surface 96 of outer rails 38, 40. Although flanged guide wheels 86 are not mandatory, such a structure provides added stability to the vehicle during travel on monorail 12. Still further, guide wheels 86 are preferably spaced approximately 10 inches apart in the lateral direction. Smaller spacing decreases the stability of the vehicle about the longitudinal centerline. However, increased spacing may make it difficult to store coupler 16 within the top of vehicle 14.

Cylindrical body 90 of guide wheels 86 are approximately 7 inches in diameter and the diameter of the flanged portion 94 is about 7.5 inches. However, the diameter of guide wheels 86 will vary depending upon the intended speed of vehicle 14. As the velocity increases, larger diameter guide wheels should be used to prevent breakdown of the wheel bearings. However, the present size is believed to be satisfactory for the contemplated top speed of 180 miles per hour.

Guide wheels 86 are preferably manufactured from a hard material, such as iron or steel, to minimize friction between them and monorail 12. This serves to increase the energy efficiency of monorail transportation system 10.

The positioning of brackets 80, 81 along the top of vehicle 14, and the longitudinal spacing between brackets 80, 81 is dependent upon the weight distribution of vehicle 14. Preferably, brackets 80, 81 are spaced approximately equidistant from the center of gravity of vehicle 14. This serves to balance the weight approximately equally between front bracket 80 and rear bracket 81. Ultimately, as will be recognized by those skilled in the art, placement of brackets 80, 81 should be dependent on the weight distribution of vehicle 14.

To raise and lower brackets 80, 81 between the recessed position and extended position, any known device may be used. For example, an air or screw cylinder 91 mounted between cavity floor 64 and brackets 80, 81 may be used.

Figure 6:
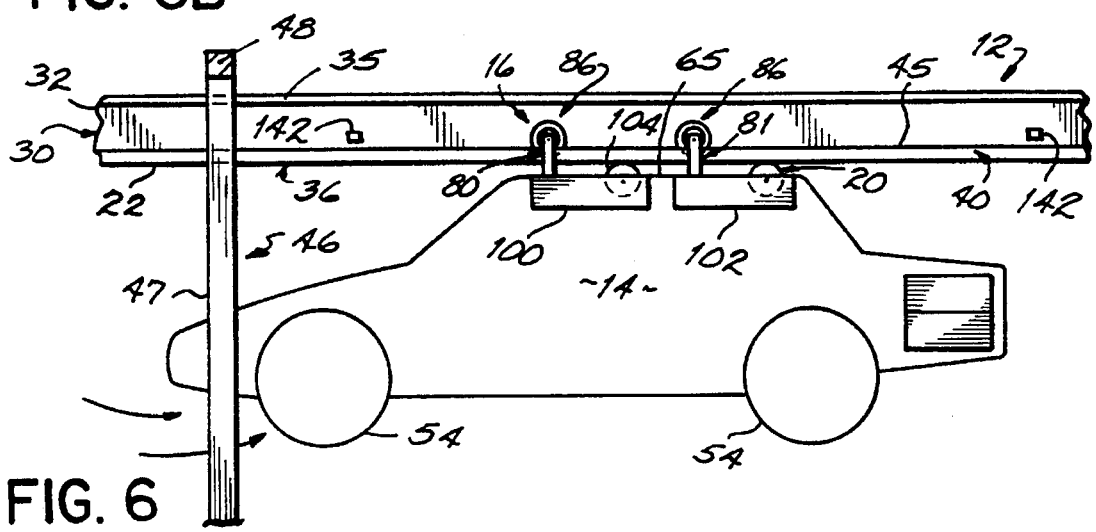
FIG. 6 is a side elevational view of another monorail transportation system in accordance with the principles of the present invention.

Alternatively, as shown in FIG. 6, drive system 15 may be distributed in separate front and rear cavities 100, 102 positioned near the windshield and rear window of vehicle 14 respectively. In this embodiment, front cavity is sized to hold front bracket 80 while rear cavity 102 is sized to hold rear bracket 81, drive wheel 20, electric motor 24 and platform 66. Additionally, front cavity 100 may include an unpowered traveler wheel 104. Traveler wheel 104 is rotatably mounted on a platform similar to platform 66 upon which drive wheel 20 is mounted. Further, the platforms are pivoted by rigid mechanical lift members similar to mechanically actuated cylinder 74. This permits the extent that the platforms are pivoted, and hence the extent that drive wheel 20 and traveler wheel 104 are extended, to be accurately controlled.

Controlled raising and lowering of drive wheel 20 and traveler wheel 104 provides a significant benefit. At the high speeds achievable by vehicle 14, it is expected that a significant amount of lift on vehicle 14 will be developed. As the lift exceeds an amount to raise vehicle 14 upwardly, drive wheel 20 and traveler wheel 104 may be lowered a small amount, i.e., about 1 inch. As these wheels are lowered, vehicle 14 moves vertically upward, permitting guide wheels 86 to leave contact with monorail 12. This reduces friction between vehicle 14 and monorail 12 further improving efficiency and speed. Thus, vehicle 14 is retained on monorail 12 by the upwardly directed lift causing drive wheel 20 and traveler wheel 104 to remain in contact with monorail 12. Traveler wheel 104 serves to balance vehicle 14 and prevent pivoting about the lateral axis of vehicle 14.

As the velocity of vehicle 14 decreases, the lift thereon becomes insufficient to lift guide wheels 86 off of monorail 12. At that point, drive wheel 20 and traveler wheel 104 are extended their full amount to maintain contact with lower surface or underside 22 of monorail 12.

With specific reference to FIGS. 2 and 3A, to draw electric power from an electric supply available along monorail 12, arms 84 of rear bracket 81 include electric contacts 120, 122 adapted to interface with electric contacts 50, 52 on monorail 12. Electric contacts 120, 122 are electrically connected (not shown) to a controller 124 that is in turn connected to electric motor 24 for providing power thereto when vehicle 14 is suspended from monorail 12. Controller 124 enables the speed of electric motor 24, and hence vehicle 14, to be varied during travel along monorail 12. For example, controller 124 could be linked to the "gas pedal" of vehicle 14 to permit the driver to manually control the velocity of vehicle 14. Alternatively, controller 124 could be operated by an onboard computer as will be discussed below. A meter (not shown) could be mounted on vehicle 14 to monitor the amount of electricity being drawn thereby. This would permit individual users to be billed based upon their electric usage. Additionally, an alternator 126 is shown rotatably connected to one of the guide wheels 86 and electrically coupled to batteries 56. This would enable batteries 56 to be charged during travel of vehicle 14 along monorail 12. Alternatively, alternator 126 may be coupled to traveler wheel 104, if present. Still further, power drawn directly from electric contacts 50, 52 may be used to charge batteries 56 as will be readily apparent to those skilled in the art.

Providing an electric supply along monorail 12 obviates the need for an expensive infrastructure of charging stations. Rather, the vehicles traveling on monorail 12 can draw the power from the monorail 12 for propelling vehicle 14, which in turn is used for charging batteries 56 which propel vehicle 14 during road travel.

Figure 4:
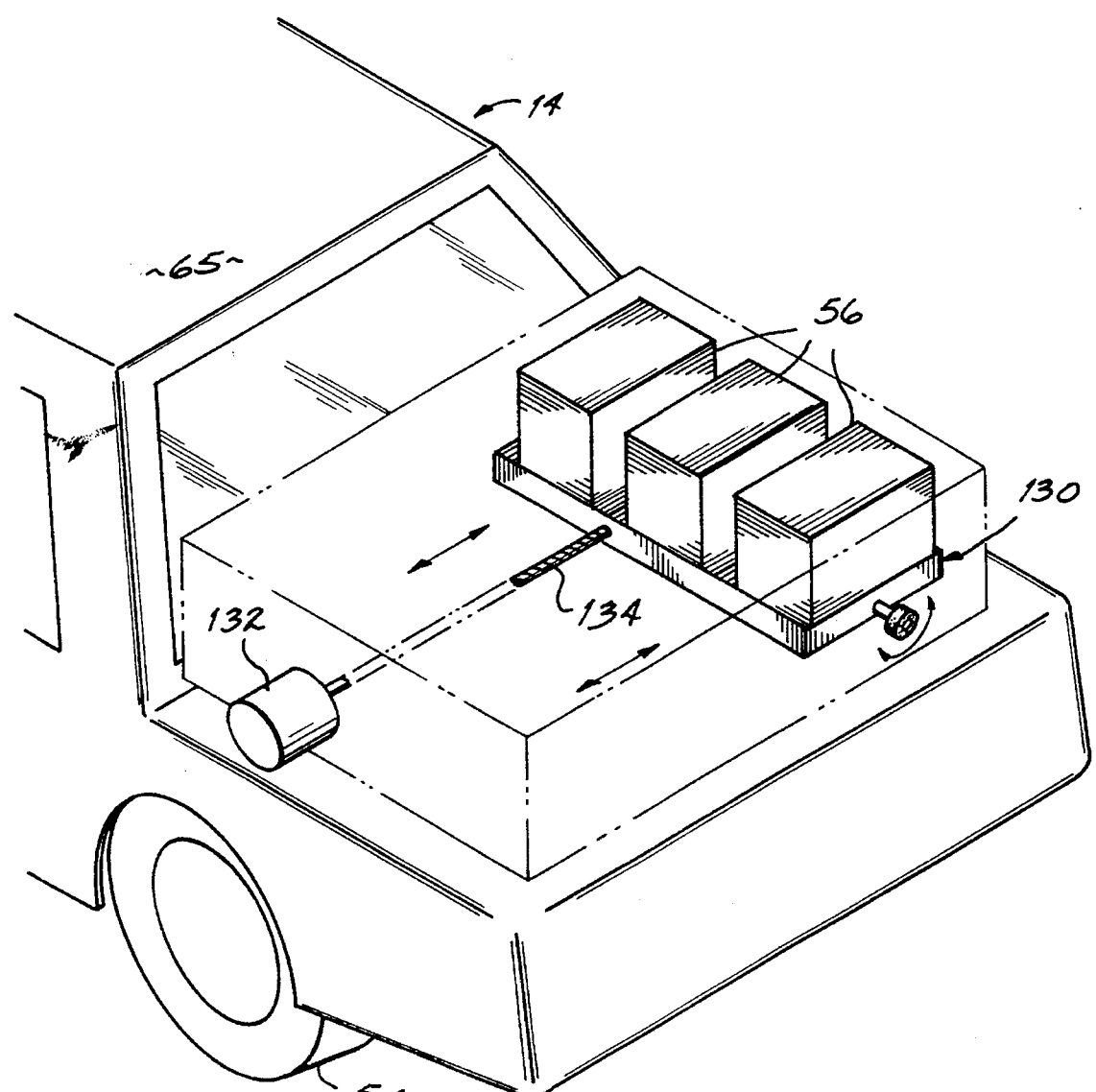
FIG. 4 is a partial perspective rear view of the vehicle of the monorail transportation system of FIG. 1 showing the battery sled.

As best seen in FIG. 4, vehicle 14 includes a sled 130 that is movably mounted in the rear of vehicle 14. Sled 130 is movable by a sled motor 132 that is threadably connected to sled 130 by a threaded drive screw 134. Activation of sled motor 132 causes drive screw 134 to rotate, thereby moving sled 130 relative to vehicle 14. A mass, such as batteries 56, is secured to sled 132 to act as a counterbalance for compensating weight distribution in vehicle 14, which would otherwise result in more weight being supported along one side of monorail 12 than the other. As the weight in vehicle 14 shifts, sled motor 132 is automatically activated to drive sled 130 in one direction or the other so as to counterbalance the weight in the vehicle and maintain the center of gravity directly beneath monorail 12. The automatic activation could be based upon the weight supported on each seat of vehicle 14 or by accelerometers mounted on vehicle 14. However, other methods of activating sled motor 132 will be readily apparent to those skilled in the art. As batteries 56 are estimated to weigh upwards of 200 pounds, their use as the counterbalance mass permits sled 130 to easily accommodate substantial weight distributions within vehicle 14, Balancing of vehicle 14 serves to reduce bending stresses about the longitudinal axis of monorail 12. However, vehicle 14 may be manufactured without such a battery sled counterbalance system without departing from the spirit or scope of the present invention. Further, sled 130 and batteries 56 may be mounted in other locations of vehicle 14.

In another aspect of the invention, monorail transportation system 10 may include a computer control system to aid in controlling vehicle 14 during travel along monorail 12. To this end, and as best seen in FIG. 1, monorail transportation system 10 may include one or more remote computers (not shown) and/or an onboard computer 140 mounted in vehicle 14.

Onboard computer 140 may include a map of the monorail network for the entire country, along with preset velocities for segments of monorail 12, electronically stored therein. Additionally, onboard computer 140 may be in a communication with the Global Positioning System (GPS) satellite network. The longitude and latitude of vehicle 14 can be obtained from the GPS, which is then used by onboard computer 140 to determine the location of vehicle 14 on monorail transportation system 10. This in turn may be graphically displayed to the driver or used to control the velocity of vehicle 14 based upon the preset information. To control spacing between vehicles 14 on monorail 12, each vehicle may include infrared sensors (not shown) linked to onboard computer 140. As the distance between the vehicles drops below a preset value, onboard computer 140 reduces the velocity of vehicle 14 accordingly. This information (i.e., vehicle location and velocity) may be relayed to a remote computer through a cellular phone, radio link, or any other communication system. The remote computer may then relay this traffic information to the onboard computers of other vehicles on the system for providing traffic information to drivers or for automatic rerouting of vehicles.

Alternatively, overhead monorail 12 may include a plurality of active or passive sensors 142 spaced therealong. Sensors 142 may be adapted to track vehicle 14 traveling along monorail 12 and relay the information to the central computer or sensors 142 may have indicia formed thereon that provide location information to onboard computer 140. To this end, a wiper 144 linked to onboard computer 140 extends inwardly from one of guide wheels 86 mounted on rear bracket 81. As vehicle 14 travels along monorail 12, wiper 144 passes by and electrically contacts sensor 142. During this contact, wiper 144 may transmit information to or receive information from sensor 142. For example, passage of vehicle 14 by sensor 142 may be relayed by sensor 142 to the remote computer for use in tracking all vehicles on monorail transportation system 10. Similarly, wiper 144 may electronically read indicia on sensor 142 indicating position and/or monorail velocity information that is then relayed to onboard computer 140. Onboard computer 140 and the remote computer would be in communication through a cellular phone, radio link, or other communication system. Further, as described above, vehicle 14 may include infrared sensors to control spacing between vehicles on monorail transportation system 10.

Under either method, the remote computer and onboard computer 140 may be used to automatically control vehicle 14. The driver would enter a destination location into onboard computer 140, which would communicate with the remote computer to obtain traffic information. Onboard computer 140 would then select a route and independently, or in conjunction with the remote computer, control vehicle 14 during travel along monorail 12.

Such a computer control system would be particularly beneficial in use with unmanned cargo vehicles. Onboard computer 140 could be programmed with the destination location and it in conjunction with the remote computer system would control vehicle 14 during the travel between the embarkation point and destination. Other variations of this computer control system will be readily apparent to those skilled in the art.

Figure 5:
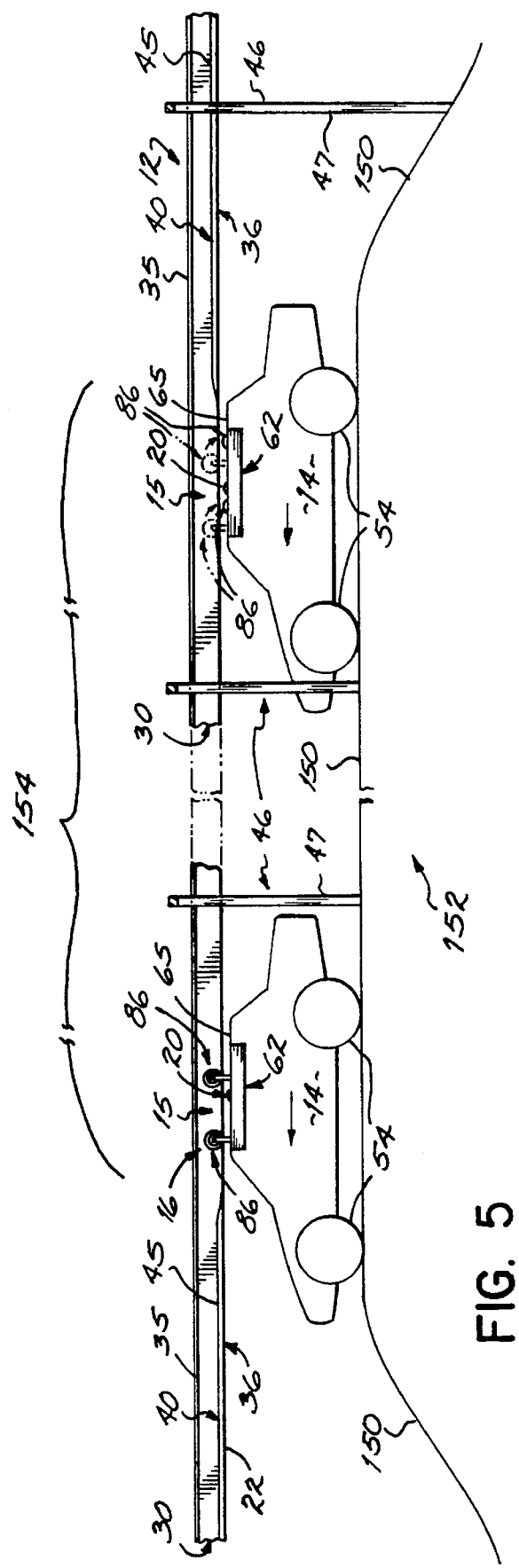
FIG. 5 is a side elevational view of a mounting station for the monorail transportation system of FIG. 1.

Monorail 12 generally is maintained at a height such that vehicles 14 traveling therealong do not contact the ground. Thus, to mount and dismount vehicle 14 from monorail 12, the elevation separating monorail 12 from the ground must be reduced. To this end, a standard road surface 150 is elevated toward monorail 12 at a mounting station 152 such that the distance separating monorail 12 and road surface 150 is decreased (FIG. 5). The separation distance is reduced to the point where the road surface wheels 54 of a vehicle 14 traveling along monorail 12 would contact road surface 150. This separation is maintained in a transition zone generally designated as 154 having a length sufficient to permit vehicle 14 to transition from road travel to monorail travel or from monorail travel to road travel. Through substantially all of transition zone 154, horizontal flange 36 and outer rails 38, 40 are eliminated from monorail 12 for a purpose to be described below. After transition zone 154, the separation between monorail 12 and road surface 150 is again increased.

To dismount vehicle 14 from monorail 12, vehicle 14 travels along monorail 12 into mounting station 152. After road surface wheels 54 contact road surface 150 and upon entering transition zone 154, vehicle 14 may transition to traveling under its own power. Brackets 80, 81 and drive wheel 20 may then be recessed back into the top of vehicle 14. Control of the transition process, including recessing brackets 80, 81 and drive wheel 20, may be manual or automatic. For example, proximity switches (not shown) may be used to activate raising and lowering of these components upon entering mounting station 152. However, other means may be used as will be readily appreciated by those skilled in the art. After transitioning to road travel, vehicle 14 is propelled along road surface 150, which is then lowered away from monorail 12. Vehicle 14 is then driven as a standard road surface vehicle.

Alternatively, to mount monorail transportation system 10, a reverse procedure is used. Vehicle 14 approaches mounting station 152 where the road surface 150 has been elevated toward monorail 12. As vehicle 14 enters transition zone 154, brackets 80, 81 are extended and drive wheel 20 is raised to engage lower surface or underside 22 of monorail 12. The entrance region to transition zone 154 may be similar to that for an automatic car wash to aid in positioning vehicle 14 relative to monorail 12. Drive wheel 20 is energized and vehicle 14 transitions to being powered by electric motor 24. After exiting transition zone 154, horizontal flange 36 and outer rails 38, 40 are again included on monorail 12. Road surface 150 drops away from monorail 12 and vehicle 14 continues along monorail 12. During travel along monorail 12, vehicle 14 is powered by electric motor 24, which is operatively interconnected to drive wheel 20. Drive wheel 20 engages lower surface or underside 22 of monorail 12 to propel vehicle 14 therealong. Guide wheels 86 movably engage upper surface 18 of monorail 12 and freely travel therealong.

Although mounting station 152 is shown as permitting vehicles 14 to mount and dismount from monorail 12 at the same location, it will be readily appreciated that mounting station 152 may be modified to permit only mounting to or dismounting from monorail 12. Such a system would reduce congestion at these locations.

It is contemplated that vehicle 14 will be a relatively lightweight vehicle. As its intended use is generally as a short distance commuting vehicle while unattached from monorail 12, vehicle 14 is intended to have a road surface speed of approximately 40 miles per hour. As such, vehicle 14 may be manufactured from aluminum or other lightweight materials and need not include many of the standard safety features found on high speed automobiles today. For example, due to the relatively low speeds, heavy bumpers and collision panels may be unnecessary. Further, during travel along monorail 12, vehicle 14 may be controlled by onboard computer 140 and the central computer system, thereby reducing the likelihood of collisions on monorail transportation system 10.

Further, because vehicle 14 will need travel only relatively short distances while separated from monorail 12, standard lead-acid batteries 56 will likely be sufficient to provide the necessary electric storage capacity.

By virtue of the foregoing, there is thus provided a monorail transportation system that is adapted to support a vehicle therebeneath for travel along the monorail wherein the vehicle is capable of traveling on standard road surfaces under its own power. Additionally, the vehicle includes the means for propelling the vehicle along the monorail and draws its power from the monorail system, thereby eliminating vehicle emissions during travel.

While the present invention has been illustrated by description of embodiments which have been described in considerable detail, it is not the intention of the Applicant to restrict or in any way limit the scope of the appended claims to such detail. Additional advantages will readily appear to those skilled in the art. For example, brackets 80, 81 may be altered to be pivoted laterally rather than longitudinally from a front to back direction. Additionally, a monorail 12 wherein U-shaped channels 42, 44 are displaced vertically rather than laterally will function within the principles herein. Still further, monorail 12 may be lowered in elevation at mounting station 152 rather than elevating road surface 150. Thus, the invention in its broadest aspects is not limited to the specific details, representative apparatus and method, and illustrative examples shown and described. Accordingly, departures may be made from the details without departing from the spirit or scope of Applicant's general inventive concept.

What is claimed is:

1. A transportation system comprising:

an elongated, overhead monorail having an upper surface and a lower surface, and a pair of laterally adjacent, U-shaped channels formed therein, the upper surface of the monorail including at least an inside surface of each of the channels;

a vehicle adapted to selectively travel on one of a road surface and the monorail;

a coupler removably supporting the vehicle from the upper surface of the monorail for travel therealong having a bracket pivotally connected to the top of the vehicle and being pivotable between a ressed position within the top of the vehicle and an extended position, and a pair of guide wheels spaced to be movably received in the U-shaped channels, the wheels being rotatably connected to the bracket; and a drive wheel connected to the top of the vehicle engaging the lower surface of the monorail when the vehicle is supported therebeneath for propelling the vehicle along the monorail.

2. The transportation system of claim 1 further comprising:

an elongated, electric supply conductor accessible along the monorail; and an electric connector electrically attached to an electric motor on the vehicle, the electric connector being adapted to draw electricity from the electric supply conductor for powering the electric motor when the vehicle is supported beneath the monorail, the electric motor being operatively interconnected to the drive wheel for propelling the vehicle along the monorail.

3. The transportation system of claim 1, the drive wheel being movable between a recessed position substantially within the top of the vehicle during road travel and an extended position for engaging the lower surface of the monorail during travel therealong.

4. The transportation system of claim 3 further comprising a lifting member located between the drive wheel and the vehicle to move the drive wheel between the recessed position and the extended position.

5. The transportation system of claim 3 further comprising a platform pivotally mounted to the top of the vehicle and a lifting member located between the platform and the vehicle to pivot the platform between a recessed position and an extended position, the drive wheel being rotatably mounted to the platform for movement therewith.

6. The transportation system of claim 5 wherein the lifting member is resilient.

7. The transportation system of claim 6 wherein the resilient lifting member is an inflatable air bladder.

8. The transportation system of claim 5 wherein the lifting member is a mechanically actuated cylinder.

9. The transportation system of claim 1 wherein there are two of the brackets each with a pair of the guide wheels, the brackets being longitudinally spaced along the top of the vehicle substantially equidistant from the center of gravity of the vehicle.

10. The transportation system of claim 1 wherein each of the guide wheels includes a cylindrical body and a radially outwardly extending cylindrical flange along the inside edge of the cylindrical body, the pair of guide wheels being laterally spaced apart so that the cylindrical bodies are movably supported on the top surfaces of the adjacent, U-shaped channels and the cylindrical flanges are received within the adjacent, U-shaped channels.

11. The transportation system of claim 1 further comprising:

a sled movably mounted to the vehicle, the sled having a support area to support a mass; and means for moving the sled relative the vehicle, whereby the sled may be moved relative the vehicle to alter the center of gravity of the vehicle.

12. The transportation system of claim 11 wherein the sled is mounted for movement relative the vehicle in only the lateral direction.

13. The transportation system of claim 12 wherein the means for moving the sled includes a sled motor mounted on the vehicle and a threaded drive screw coupled to the sled motor and threadably connected to the sled.

14. The transportation system of claim 11 further including a plurality of batteries supported on the sled.

15. A transportation system comprising:

an elongated, overhead monorail having a central web and a substantially horizontal flange medially attached to a lower end of the central web;

an elongated, electric supply conductor accessible along the monorail;

a vehicle adapted to travel on road surfaces under its own power;

an extendable coupler recessed within the top of the vehicle, the coupler being extendable out of the vehicle top to removably support the vehicle from the horizontal flange for travel along the monorail, the coupler having a pair of brackets pivotally connected to the top of the vehicle, the brackets being longitudinally spaced apart along the top of the vehicle and being pivotable between a recessed position within the top of the vehicle and an extended position, and a pair of guide wheels rotatably mounted on each of the pair of brackets, the guide wheels being spaced to movably travel on opposing sides of the horizontal flange;

an electric connector on said vehicle to draw electric power from the electric supply conductor during travel along the monorail;

an electric motor on the vehicle that is electrically connected to the electric connector; and an extendable drive wheel recessed in the top of the vehicle, the drive wheel being extendable out of the vehicle top to engage the bottom surface of the monorail to propel the vehicle when the vehicle is supported beneath the monorail, the drive wheel being operatively interconnected to the electric motor, whereby the vehicle is propelled by its own power when separated from the monorail and is propelled by power from the monorail when traveling therebeneath.

16. The transportation system of claim 15 further comprising:

a sled movably mounted to the vehicle, the sled having a support area to support a mass; and means for moving the sled relative the vehicle, whereby the sled may be moved relative the vehicle to alter the center of gravity of the vehicle.

17. The transportation system of claim 15 further comprising a lifting member located between the drive wheel and the vehicle to move the drive wheel between a recessed position and an extended position.

18. The transportation system of claim 15 further comprising a platform pivotally mounted to the top of the vehicle and a lifting member located between the platform and the vehicle to pivot the platform between a recessed position and an extended position, the drive wheel being rotatably mounted to the platform for movement therewith.

19. The transportation system of claim 15 further comprising an unpowered, extendable traveler wheel supported relative the top of the vehicle and being adapted to engage the lower surface of the monorail.

20. The transportation system of claim 19 further comprising a lifting member located between the traveler wheel and the vehicle to move the traveler wheel between a recessed position and an extended position.

21. The transportation system of claim 19 further comprising a platform pivotally mounted to the top of the vehicle and a lifting member located between the platform and the vehicle to pivot the platform between a recessed position and an extended position, the traveler wheel being rotatably mounted to the platform for movement therewith.

22. A transportation system comprising:

an elongated, overhead monorail having an upper surface and a lower surface; and a vehicle adapted to selectively travel on one of a road surface and the monorail, the vehicle having a drive system including upper guide wheels, a lower drive wheel, and a traveler wheel, the upper guide wheels adapted to removably engage the upper surface of the monorail, and the lower drive wheel and traveler wheel adapted to removably engage the lower surface of the monorail for supporting the vehicle from the monorail, the upper guide wheels and traveler wheel being unpowered and the lower drive wheel being powered.

23. The transportation system of claim 22 further comprising:

an elongated, electric supply conductor accessible along the monorail; and an electric connector electrically attached to an electric motor on the vehicle, the electric connector being adapted to draw electricity from the electric supply conductor for powering the electric motor when the vehicle is supported beneath the monorail, the electric motor being operatively interconnected to the drive wheel for propelling the vehicle along the monorail.

24. The transportation system of claim 22, the guide wheels being rotatably mounted on a coupler that is movably mounted to the top of the vehicle, the coupler being movable between a recessed position within the top of the vehicle during road travel and an extended position to movably support the vehicle from the monorail during travel therealong.

25. The transportation system of claim 24, the coupler including a bracket pivotally mounted to the top of the vehicle, the bracket being pivotable between a recessed position within the top of the vehicle and an extended position, the bracket having two of the guide wheels being rotatably mounted on the bracket and being laterally spaced to movably travel on opposing sides of the monorail.

26. The transportation system of claim 22, each of the drive wheel and the traveler wheel being supported relative the top of the vehicle and being movable between a recessed position within the top of the vehicle during road travel and an extended position for engaging the lower surface of the monorail during travel therealong.

27. A vehicle for traveling along a monorail comprising:

a coupler connected to the top of the vehicle adapted to removably support the vehicle from an upper surface of said monorail for travel therealong;

a drive wheel accessible at the top of the vehicle for engaging a lower surface of said monorail when the vehicle is supported therebeneath to propel the vehicle along said monorail; and an unpowered traveler wheel accessible at the top of the vehicle for engaging the lower surface of the monorail.

28. The vehicle of claim 27 further comprising:

an electric connector secured to the vehicle adapted to draw electricity from an elongated electric supply conductor accessible along said monorail; and an electric motor on the vehicle that is electrically connected to the electric connector, the electric motor being operatively interconnected to the drive wheel for propelling the vehicle along said monorail when supported therefrom.

29. The vehicle of claim 27, further comprising means for the vehicle to travel on road surfaces when separated from said monorail.

30. The vehicle of claim 29, the coupler being movable between a recessed position within the top of the vehicle during standard road travel and an extended position to movably support the vehicle from said monorail during travel therealong.

31. The vehicle of claim 30, the coupler including:

a bracket pivotally mounted to the top of the vehicle, the bracket being pivotable between a recessed position within the top of the vehicle and an extended position; and a pair of guide wheels rotatably connected to the bracket, the guide wheels being laterally spaced to travel on opposing sides of an upper surface of said monorail.

32. The vehicle of claim 29 further comprising a lifting member operatively interconnected to the drive wheel so as to move the drive wheel between a recessed position within the top of the vehicle during road travel and an extended position for engaging a lower surface of a monorail during travel therealong.

33. The vehicle of claim 32 further comprising a platform pivotally mounted to the top of the vehicle, the lifting member being located between the platform and the vehicle to pivot the platform between a recessed position and an extended position, the drive wheel being rotatably mounted to the platform for movement therewith.

34. The vehicle for traveling along a monorail of claim 27 further comprising:

a sled movably mounted to the vehicle, the sled having a support area to support a mass; and means for moving the sled relative the vehicle, whereby the sled may be moved relative the vehicle to alter the center of gravity of the vehicle.

35. The vehicle of claim 34 wherein the sled is mounted for movement relative the vehicle in only the lateral direction.

36. The vehicle of claim 33 wherein the means for moving the sled includes a sled motor mounted on the vehicle and a threaded drive screw coupled to the sled motor and threadably connected to the sled.

37. The vehicle of claim 34 further including a plurality of batteries supported on the sled.

38. In a vehicle adapted to travel on a monorail, the vehicle having an electric motor for propelling the vehicle in at least one mode of use, a system for balancing the vehicle comprising:

a sled movably mountable to the vehicle, the sled supporting a plurality of batteries operatively interconnected to the electric motor for powering same; and means mounted on the vehicle for moving the sled relative said vehicle, whereby the sled may be moved relative to the vehicle to alter the center of gravity of the vehicle.

39. The system for balancing a vehicle of claim 38 wherein the sled is mounted for movement relative the vehicle in only the lateral direction.

40. The system for balancing a vehicle of claim 39 wherein the means for moving the sled includes a sled motor mounted on the vehicle and a threaded drive screw coupled to the sled motor and threadably connected to the sled.

41. A method for mounting a vehicle onto a monorail having a central web and a substantially horizontal flange medially attached to a lower end of the central web, the horizontal flange having an upper surface and a lower surface, the vehicle being adapted to travel under its own power on a road surface and having a coupler connected to the top of the vehicle for removably supporting the vehicle from the upper surface of the horizontal flange for travel therealong, the coupler being extendable between a recessed position and an extended position and having a pair of guide wheels spaced to movably travel on opposing sides of the horizontal flange, the guide wheels being rotatably connected to the coupler, and a drive wheel for propelling the vehicle on the monorail, comprising:

supplying the elongated, overhead monorail;

supplying a road surface;

reducing the vertical separation between the monorail and the road surface while propelling the vehicle along the road surface and under the monorail; and while the vehicle is still moving, engaging the opposing sides of the horizontal flange with the guide wheels and the drive wheel with the lower surface of the horizontal flange and increasing the vertical separation between the monorail and the road surface;

whereby the coupler supports the vehicle beneath the monorail and the drive wheel propels the vehicle therealong.

42. The method for mounting a vehicle onto a monorail of claim 41, the horizontal flange being eliminated from the monorail when the vertical separation between the monorail and the road surface is reduced.

43. The method for mounting a vehicle onto a monorail of claim 42, the drive wheel being supported relative the top of the vehicle and being movable between a recessed position and an extended position, further comprising:

moving the coupler to the extended position; and moving the drive wheel to the extended position to engage the lower surface of the horizontal flange.

44. A method for dismounting a vehicle from a monorail having a central web and a substantially horizontal flange medially attached to a lower end of the central web, the horizontal flange having an upper surface and a lower surface, the vehicle being adapted to travel under its own power on a road surface and having a coupler connected to the top of the vehicle for removably supporting the vehicle from the upper surface of the horizontal flange for travel therealong, the coupler being extendable between a recessed position and an extended position and having a pair of guide wheels spaced to movably travel on opposing sides of the horizontal flange, the guide wheels being rotatably connected to the coupler, and a drive wheel for propelling the vehicle on the monorail, comprising:

supplying the elongated overhead monorail;

supplying a road surface;

reducing the vertical separation between the monorail and the road surface while propelling the vehicle along the monorail until the vehicle contacts the road surface;

energizing the road surface wheels; and while the vehicle is still moving, disengaging the guide wheels from the opposing sides of the horizontal flange and drive wheel from the lower surface of the horizontal flange and propelling the vehicle on the road surface wheels from underneath the monorail.

45. The method for dismounting a vehicle from a monorail of claim 44, the horizontal flange being eliminated from the monorail when the vertical separation between the monorail and the road surface is reduced.

46. The method for dismounting a vehicle from a monorail of claim 45, the drive wheel being supported relative the top of the vehicle and being movable between a recessed position and an extended position, further comprising lowering the coupler and drive wheel into the recessed position.

47. A transportation system comprising:

an elongated, overhead monorail having a central web and a substantially horizontal flange medially attached to a lower end of the central web, the horizontal flange having an upper surface and a lower surface;

a vehicle adapted to selectively travel on one of a road surface and the monorail;

a coupler accessible at the top of the vehicle removably supporting the vehicle from the upper surface of the horizontal flange for travel therealong, the coupler being extendable between a recessed position and an extended position and having a pair of guide wheels spaced to movably travel on opposing sides of the horizontal flange, the guide wheels being rotatably connected to the coupler; and a drive wheel accessible at the top of the vehicle engaging the lower surface of the horizontal flange when the vehicle is supported therebeneath for propelling the vehicle along the monorail.

48. The transportation system of claim 47 further comprising:

an elongated, electric supply conductor accessible along the monorail; and an electric connector electrically attached to an electric motor on the vehicle, the electric connector being adapted to draw electricity from the electric supply conductor for powering the electric motor when the vehicle is supported beneath the monorail, the electric motor being operatively interconnected to the drive wheel for propelling the vehicle along the monorail.

49. The transportation system of claim 47, the drive wheel being movable between a recessed position substantially within the top of the vehicle during road travel and an extended position for engaging the lower surface of the monorail during travel therealong.

50. The transportation system of claim 49 further comprising a lifting member located between the drive wheel and the vehicle to move the drive wheel between the recessed position and the extended position.

51. A transportation system comprising:

an elongated, overhead monorail having an upper surface and a lower surface; and a vehicle adapted to selectively travel on one of a road surface and the monorail, the vehicle having a coupler removably supporting the vehicle from the upper surface of the monorail for travel therealong, the coupler including a pair of brackets pivotally connected to the top of the vehicle, the brackets being longitudinally spaced apart along the top of the vehicle and being pivotable between a recessed position and an extended position, and a pair of guide wheels rotatably mounted on each of the pair of brackets, the guide wheels being spaced to movably travel on opposing sides of the overhead monorail, and a drive wheel engaging the lower surface of the monorail when the vehicle is supported therebeneath for propelling the vehicle along the monorail, the vehicle including a propulsion system for propelling the vehicle when traveling on a road surface and an electric motor, mechanically independent from the propulsion system, for propelling the vehicle when traveling on the monorail.

52. The transportation system of claim 51 further comprising:

an elongated, electric supply conductor accessible along the monorail; and an electric connector electrically attached to the electric motor on the vehicle, the electric connector being adapted to draw electricity from the electric supply conductor for powering the electric motor when the vehicle is supported beneath the monorail, the electric motor being operatively interconnected to the drive wheel for propelling the vehicle along the monorail.

53. The transportation system of claim 51, the coupler being supported relative the top of the vehicle and being movable between a recessed position substantially within the top of the vehicle during road travel and an extended position to movably support the vehicle from the monorail during travel therealong.

54. The transportation system of claim 53, the drive wheel being supported relative the top of the vehicle and being movable between a recessed position substantially within the top of the vehicle during road travel and an extended position for engaging the lower surface of the monorail during travel therealong.

55. The transportation system of claim 54 further comprising a lifting member located between the drive wheel and the vehicle to move the drive wheel between the recessed position and the extended position.

56. A transportation system comprising:

an elongated, overhead monorail having a central web, a substantially horizontal flange medially attached to a lower end of the central web, the horizontal flange having a lower surface and right and left sides, and a pair of substantially vertical outer rails extending upwardly from respective ones of the right and left sides of the horizontal flange; and a vehicle adapted to selectively travel on one of a road surface and the monorail, the vehicle having a coupler removably supporting the vehicle from the upper surface of each of the outer rails for travel therealong and a drive wheel engaging the lower surface of the horizontal flange when the vehicle is supported therebeneath for propelling the vehicle along the monorail.

57. The transportation system of claim 56, the coupler being supported relative the top of the vehicle and being movable between a recessed position substantially within the top of the vehicle during road travel and an extended position to movably support the vehicle from the upper surfaces of the outer rails during travel along the monorail.

58. The transportation system of claim 57, the drive wheel being supported relative the top of the vehicle and being movable between a recessed position substantially within the top of the vehicle during road travel and an extended position for engaging the lower surface of the horizontal flange during travel along the monorail.

59. The transportation system of claim 58 further comprising a lifting member located between the drive wheel and the vehicle to move the drive wheel between the recessed position and the extended position.

60. The transportation system of claim 56 wherein the coupler includes:
- a pair of brackets pivotally connected to the top of the vehicle, the brackets being longitudinally spaced apart along the top of the vehicle and being pivotable between a recessed position within the top of the vehicle and an extended position; and
- a pair of guide wheels rotatably mounted on each of the pair of brackets, the guide wheels being spaced to movably travel on the upper surface of each of the outer rails.

61. A transportation system comprising:
- an elongated, overhead monorail having an upper surface and a lower surface;
- a vehicle adapted to ;selectively travel on one of a road surface and the monorail and having a configuration generating upwardly directed lift at high speeds sufficient to exceed the weight of the vehicle;
- a coupler accessible at the top of the vehicle removably supporting the vehicle from the upper surface of the monorail for travel therealong; and
- a drive wheel accessible at the top of the vehicle engaging the lower surface of the monorail when the vehicle is supported therebeneath for propelling the vehicle along the monorail, the drive wheel being movable relative to the top of the vehicle such that when the coupler disengages from the upper surface of the monorail, the drive wheel remains engaged with the lower surface of the monorail.

62. The transportation system of claim 62, the drive wheel being selectively extendable.

63. A method for propelling a vehicle along a monorail having an upper surface and a lower surface, the vehicle having a coupler accessible at the top of the vehicle removably supporting the vehicle from the upper surface of the monorail for travel therealong and a drive wheel resiliently connected to the top of the vehicle for engaging the lower surface of the monorail to propel the vehicle therealong, the vehicle having a configuration generating upwardly directed lift at high speeds sufficient to exceed the weight of the vehicle comprising:
- supplying the monorail;
- removably supporting the vehicle from the upper surface of the monorail by the coupler;
- engaging the lower surface of the monorail with the drive wheel;
- propelling the vehicle along the monorail with the drive wheel;
- accelerating the vehicle until the upwardly directed lift generated by the vehicle exceeds the weight of the vehicle;
- lowering the drive wheel such that the upwardly directed lift raises the vehicle, thereby disengaging the coupler from the upper surface of the monorail; and
- continuing to propel the vehicle with the drive wheel.

64. The method for propelling a vehicle of claim 63, the drive wheel being selectively extendable, wherein lowering of the drive wheel is attained by selectively lowering the drive wheel.

65. The method for propelling a vehicle along a monorail of claim 63 further comprising decelerating the vehicle until the upwardly directed lift no longer exceeds the weight of the vehicle thereby engaging the coupler with the upper surface of the monorail, and simultaneously raising the drive wheel thereby maintaining engagement between the drive wheel and the lower surface of the monorail.

66. The method for propelling a vehicle of claim 65, the drive wheel being selectively extendable, wherein raising of the drive wheel is attained by selectively raising the drive wheel.

* * * * *

UNITED STATES PATENT AND TRADEMARK OFFICE
CERTIFICATE OF CORRECTION

PATENT NO. : 5,592,883
DATED : January 14, 1997
INVENTOR(S) : F. Jay Andress, III It is certified that error appears in the above-indentified patent and that said Letters Patent is hereby corrected as shown below:

In Claim 1, Column 12, line 12, "ressed" should read -- recessed --.

In Claim 62, Column 19, line 31, "of claim 62" should read -- of claim 61 --.

Signed and Sealed this

Sixth Day of January, 1998

Attest:

Attesting Officer

BRUCE LEHMAN

Commissioner of Patents and Trademarks